United States Patent
Kajikawa

(10) Patent No.: US 8,894,496 B2
(45) Date of Patent: Nov. 25, 2014

(54) COUPLING YOKE FOR DOUBLE CARDAN JOINT

(75) Inventor: Yasushi Kajikawa, Kitakatsuragi-gun (JP)

(73) Assignee: JTEKT Corporation, Osaka (JP)

( * ) Notice: Subject to any disclaimer, the term of this patent is extended or adjusted under 35 U.S.C. 154(b) by 36 days.

(21) Appl. No.: 13/497,680

(22) PCT Filed: Sep. 27, 2010

(86) PCT No.: PCT/JP2010/066641
§ 371 (c)(1),
(2), (4) Date: Mar. 22, 2012

(87) PCT Pub. No.: WO2011/037216
PCT Pub. Date: Mar. 31, 2011

(65) Prior Publication Data
US 2012/0178541 A1    Jul. 12, 2012

(30) Foreign Application Priority Data
Sep. 28, 2009   (JP) .................................. 2009-223241

(51) Int. Cl.
*F16D 3/32*     (2006.01)

(52) U.S. Cl.
CPC ........................................ *F16D 3/32* (2013.01)
USPC .......................................................... 464/134

(58) Field of Classification Search
USPC ........... 464/114, 117, 118, 119, 134; 403/205
See application file for complete search history.

(56) References Cited

U.S. PATENT DOCUMENTS

| | | | | | |
|---|---|---|---|---|---|
| 1,281,918 | A | * | 10/1918 | Ecaubert | ........................ 464/114 |
| 1,734,978 | A | | 11/1929 | Palmgren | |
| 2,090,632 | A | * | 8/1937 | Kotrbaty | |
| 2,302,882 | A | * | 11/1942 | Ohlendorf | ..................... 464/114 |
| 3,029,618 | A | | 4/1962 | Bouchard et al. | |
| 3,050,963 | A | | 8/1962 | Simonds et al. | |
| 3,252,527 | A | | 5/1966 | Alexander et al. | |
| 3,465,546 | A | * | 9/1969 | Spyra | ........................... 464/117 |

(Continued)

FOREIGN PATENT DOCUMENTS

| BE | 857922 A2 | 2/1978 |
|---|---|---|
| DE | 930 056 | 7/1955 |

(Continued)

OTHER PUBLICATIONS

Translation of JP60185727. Jul. 15, 2013.*

(Continued)

*Primary Examiner* — Gregory Binda
*Assistant Examiner* — Matthieu Setliff
(74) *Attorney, Agent, or Firm* — Oliff PLC

(57) ABSTRACT

A coupling yoke for a double cardan joint includes: a pair of mutually facing flange portions each of which has a bearing hole for allowing a shaft portion, which is one of two shaft portions of each spider, to be rotatably installed and that protrude from each of both axial ends of a base portion in the axial direction. The base portion has a thick wall portion that couples the bearing holes of the diagonally arranged flange portions and that has an X shape when viewed in a direction along an axis of the shaft portion, which is the other one of the shaft portions of each spider and trimmed portions between adjacent thick portions of the X-shaped thick wall portion.

4 Claims, 21 Drawing Sheets

(56) References Cited

U.S. PATENT DOCUMENTS

| | | | | |
|---|---|---|---|---|
| 4,333,319 | A | * | 6/1982 | Bischoff .................. 464/118 X |
| 5,094,651 | A | * | 3/1992 | Cornay .................... 464/117 X |
| 6,139,437 | A | * | 10/2000 | Thompson ................... 464/117 |
| 2004/0002391 | A1 | * | 1/2004 | Thomas |

FOREIGN PATENT DOCUMENTS

| | | |
|---|---|---|
| DE | 1117950 | 11/1961 |
| DE | 24 53 084 A1 | 5/1976 |
| DE | 3504670 A1 | 8/1985 |
| DE | 37 14516 A1 | 12/1988 |
| FR | 1.535.633 | 8/1968 |
| GB | 495150 A | 11/1938 |
| JP | Y-42-14013 | 8/1967 |
| JP | Y-45-27928 | 10/1970 |
| JP | U-58-170425 | 11/1983 |
| JP | U-60-185727 | 12/1985 |
| JP | A-63-120919 | 5/1988 |
| JP | A-2-309016 | 12/1990 |
| JP | U-4-62925 | 5/1992 |
| JP | A-8-121493 | 5/1996 |
| JP | A-11-218149 | 8/1999 |
| JP | A-2008-208919 | 9/2008 |
| JP | A-2009-168190 | 7/2009 |
| WO | WO 00/36314 A2 | 6/2000 |

OTHER PUBLICATIONS

Translation of DE1117950B. Jan. 8, 2013.*
Nov. 9, 2010 International Search Report issued in International Patent Application No. PCT/JP2010/066641 (with translation).
Office Action issued in Japanese Patent Application No. 2009-223241 dated May 28, 2013 (with translation).
Aug. 6, 2014 Search Report issued in European Patent Application No. 10818888.9.

* cited by examiner

Conventional Art

Conventional Art

COUPLING YOKE FOR DOUBLE CARDAN JOINT

TECHNICAL FIELD

The invention relates to a coupling yoke for a double cardan joint. More specifically, it relates to a coupling yoke for a double cardan joint that couples a drive-side yoke to a driven-side yoke at both axial ends and that transmits driving force from the drive-side yoke to the driven-side yoke.

BACKGROUND ART

A known coupling yoke of this type is of a so-called split type that includes: a pair of mutually facing bridge members having bearing holes for rotatably supporting one of two shaft portions of each spider at both axial ends; surrounding means that surrounds the axial centers of both bridge members; and fastening means that fastens the bridge members and the surrounding means (for example, see Patent Document 1).

In addition, another coupling yoke is of an integral type that includes: a pair of mutually facing flange portions each of which has a bearing hole for allowing one of shaft portions of each spider to be rotatably installed and that protrude from each of both axial ends of a base portion in the axial direction. The integral-type coupling yoke is molded by casting or forging, and does not require assembling work such that bridge members and surrounding means, are assembled and then these are fastened by fastening means as in the case of the split-type coupling yoke described in Patent Document 1, so it is advantageous in terms of working man-hour. In addition, because it is of an integral type, it is excellent in terms of stiffness.

In the existing integral-type coupling yoke, the base portion from which the flange portions protrude is formed of a block-like thick wall portion; however, in the case where the drive-side yoke and the driven-side yoke, which are coupled by the coupling yoke, are spaced apart slightly, when the length of the base portion is extended in the axial direction in order to ensure torsional stiffness, the overall weight of the coupling yoke increases accordingly. As the weight increases, the inertia moment of the coupling yoke increases, so a loss of energy at the time when driving force is transmitted from the drive-side yoke to the driven-side yoke increases.

Then, in order to suppress an increase in the weight of the base portion, it is conceivable that, as shown in FIG. 20, a depressed area or a recess 112 is formed near the axial center of a base portion 111, and, as shown in FIG. 21, an opening 113 is formed similarly near the axial center of the base portion 111.

RELATED ART DOCUMENT

Patent Document

Patent Document 1: Japanese Patent Application Publication No. 8-121493

SUMMARY OF THE INVENTION

Problems to be Solved by the Invention

However, with the methods forming a depressed area or an opening in the base portion, there is a problem that, as the depressed area or the opening is slightly increased, torsional stiffness decreases and, therefore, effective weight reduction and ensuring of stiffness cannot be achieved at the same time.

The invention is contemplated in light of the above situation, and it is an object of the invention to provide a coupling yoke for a double cardan joint, which is able to achieve effective weight reduction while ensuring necessary torsional stiffness.

Means for Solving the Problems

A coupling yoke for a double cardan joint (hereinafter, also simply referred to as "coupling yoke") according to one aspect of the invention is a coupling yoke for a double cardan joint that includes: a pair of mutually facing flange portions each of which has a bearing hole for allowing one of two perpendicular shaft portions of each spider to be rotatably installed and that prOtrude from each of both axial ends of a base portion in an axial direction, wherein the base portion is formed of a thick wall portion that couples the bearing holes of the diagonally arranged flange portions and that has an X shape when viewed in a direction along an axis of the other one of the shaft portions of each spider and trimmed portions between adjacent thick portions of the X-shaped thick wall portion.

Effects of the Invention

With the coupling yoke for a double cardan joint, it is possible to achieve effective weight reduction while ensuring necessary torsional stiffness.

EMBODIMENTS OF THE INVENTION

Figure 1:
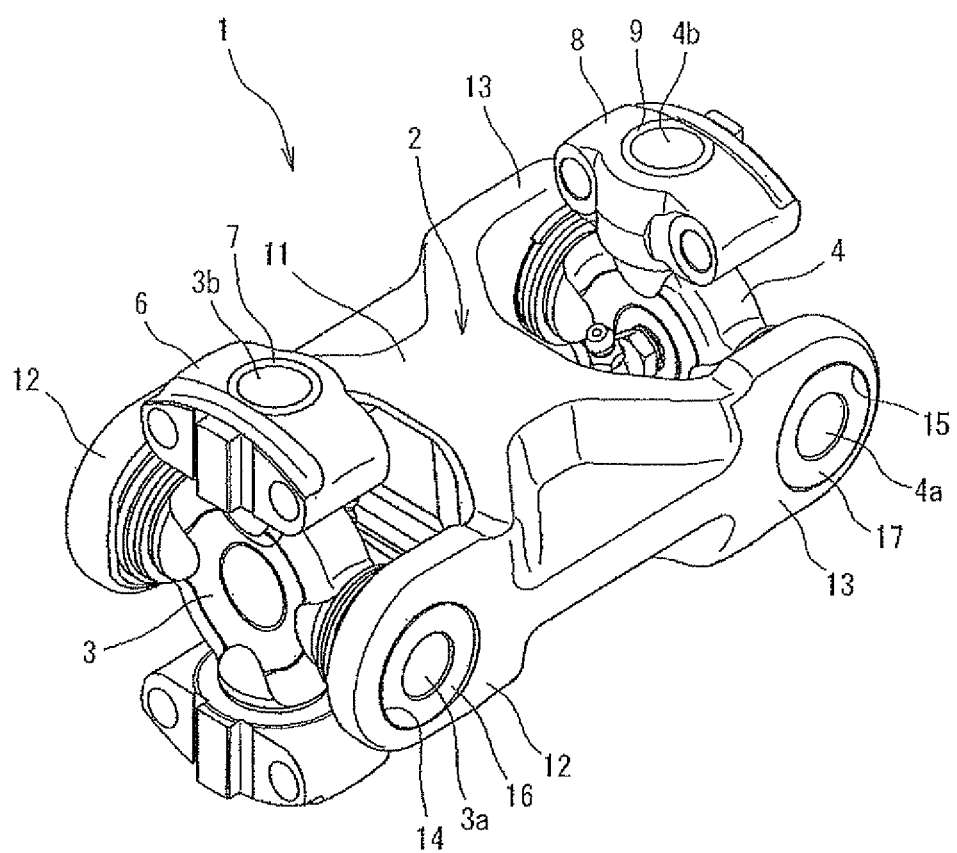
FIG. 1 is an explanatory perspective view of a double cardan joint that uses a coupling yoke according to one embodiment of the invention.
Figure 2:
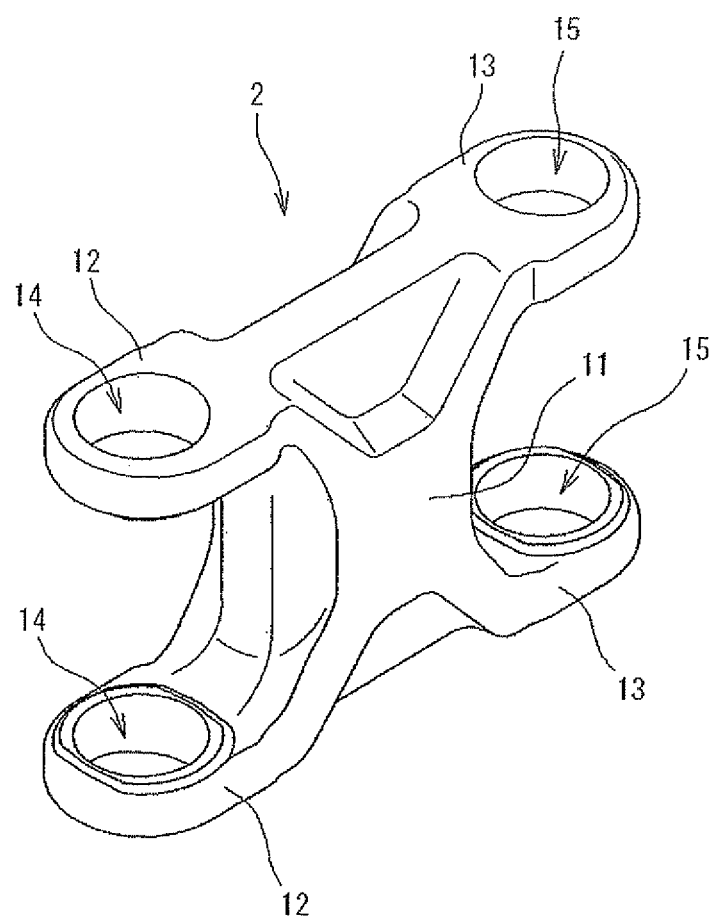
FIG. 2 is an explanatory perspective view of the coupling yoke shown in FIG. 1.
Figure 3:
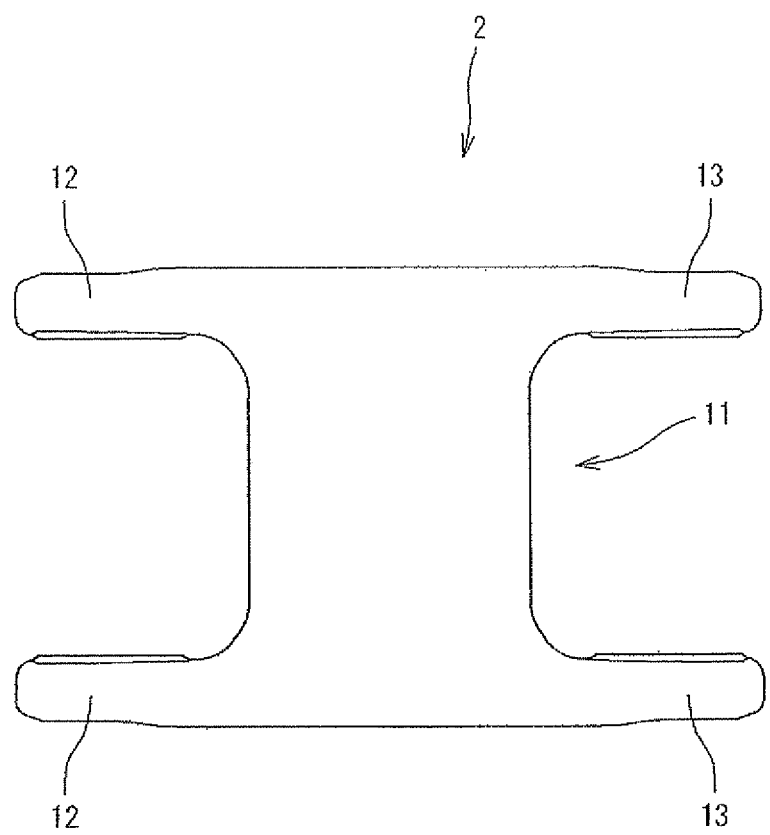
FIG. 3 is a front view of the coupling yoke shown in FIG. 2.
Figure 4:
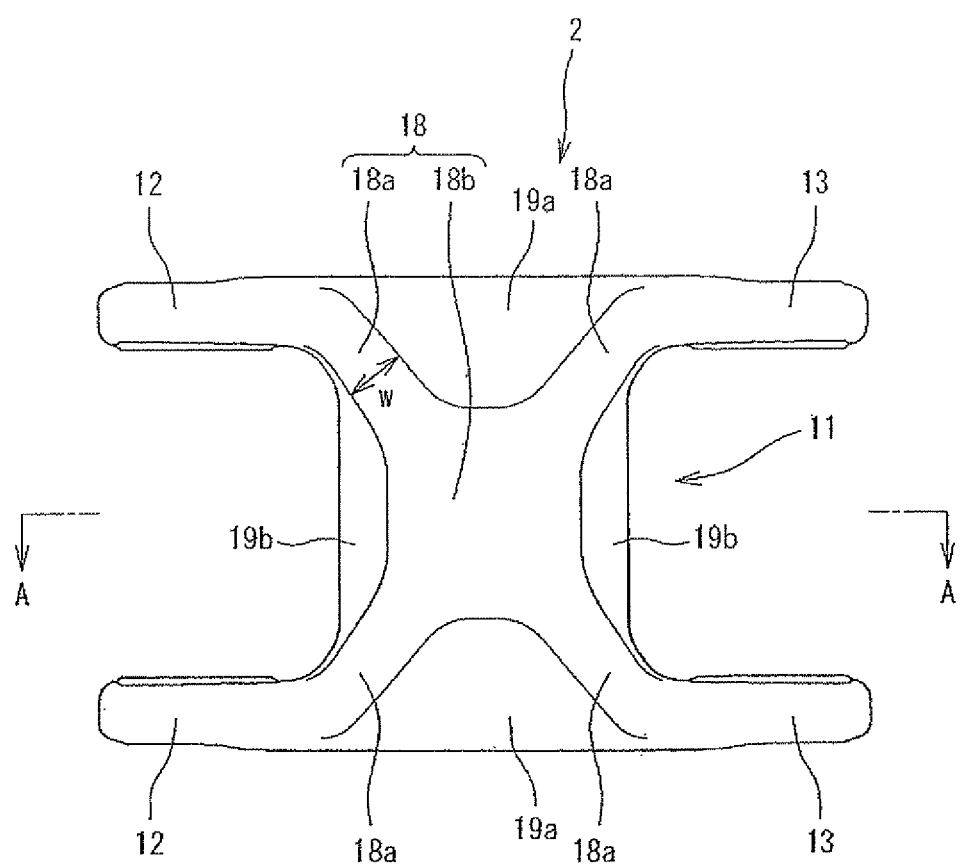
FIG. 4 is an explanatory front view of the coupling yoke shown in FIG. 2.
Figure 5:
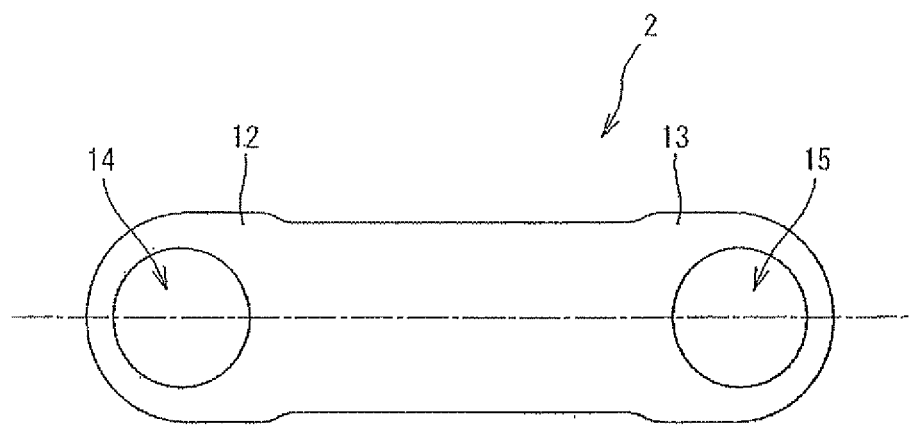
FIG. 5 is a plan view of the coupling yoke shown in FIG. 2.
Figure 6:
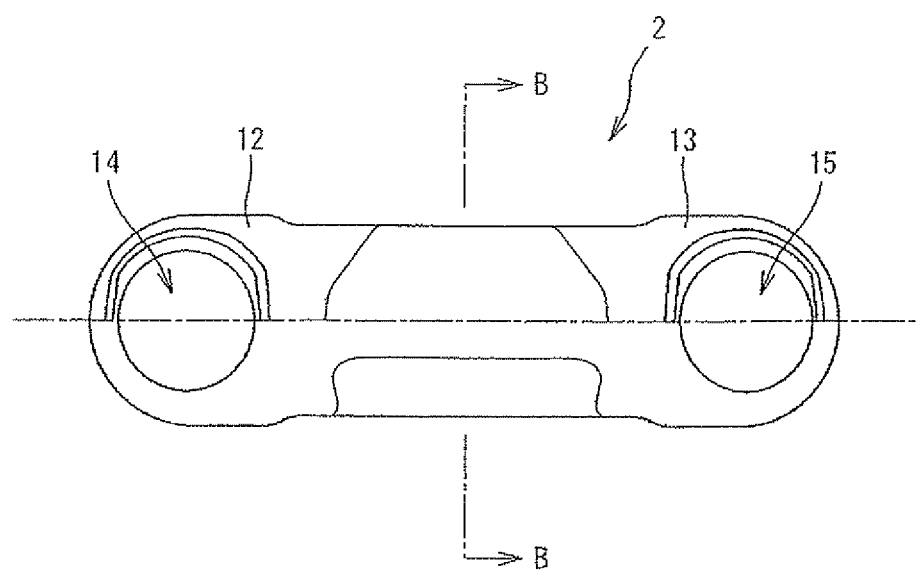
FIG. 6 is an explanatory plan view of the coupling yoke shown in FIG. 2.
Figure 7:
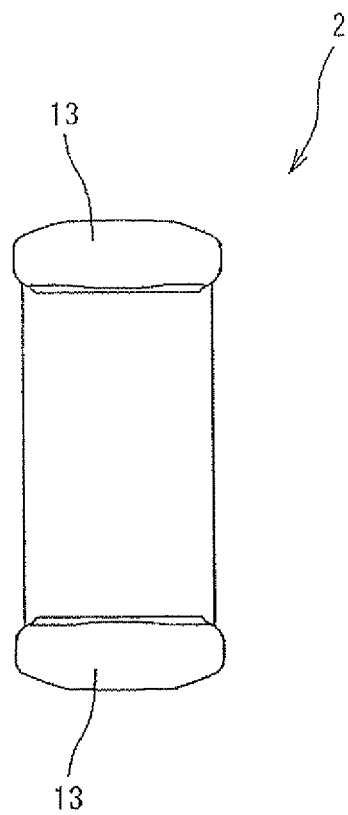
FIG. 7 is a right side view of the coupling yoke shown in FIG. 2.
Figure 8:
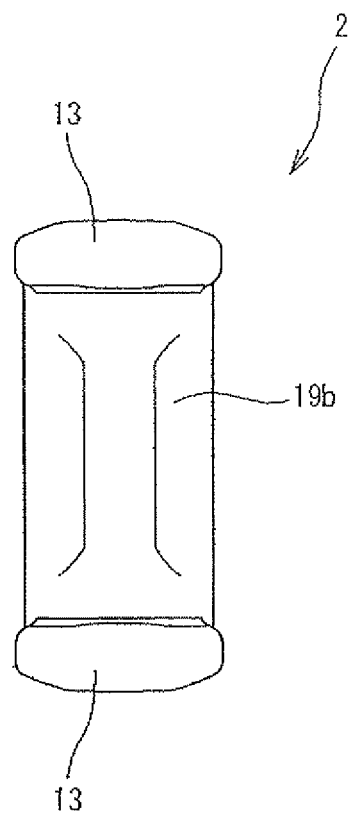
FIG. 8 is an explanatory right side view of the coupling yoke shown in FIG. 2.
Figure 9:
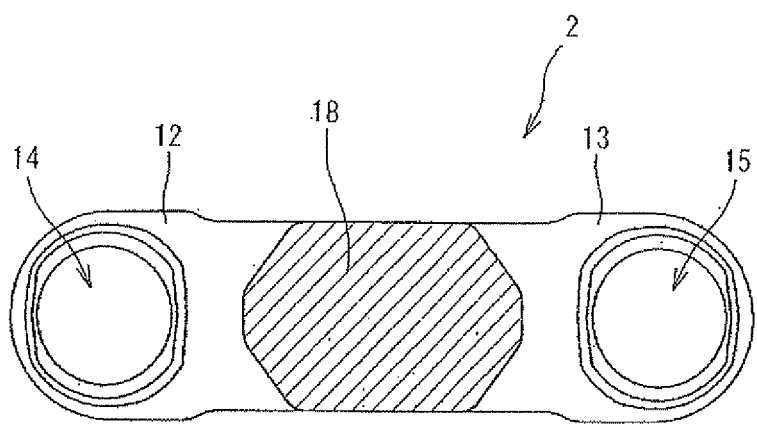
FIG. 9 is a sectional view taken along the line A-A in FIG. 4.
Figure 10:
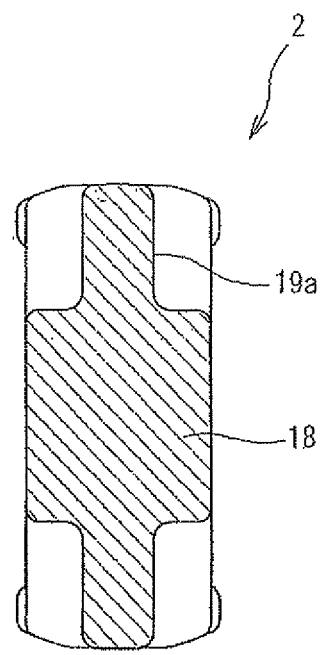
FIG. 10 is a sectional view taken along the line B-B in FIG. 6.
Figure 20:
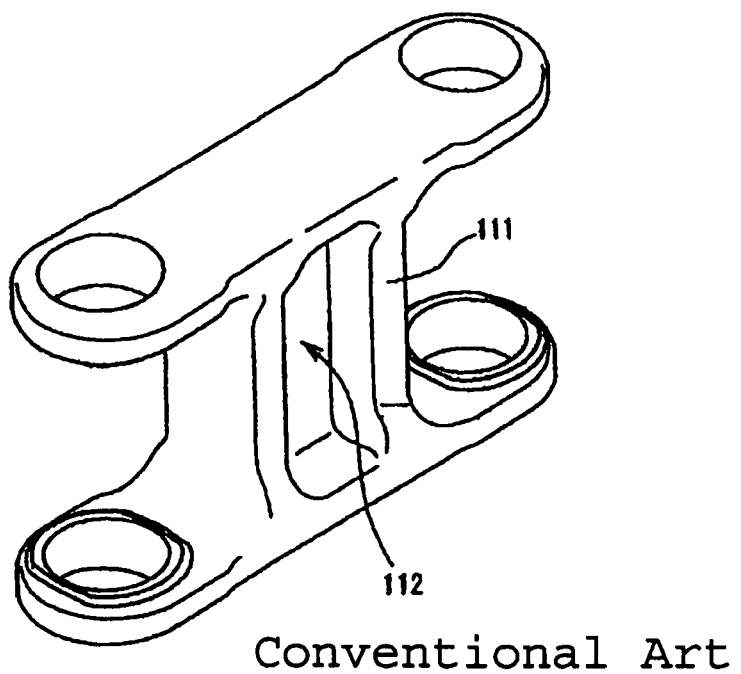
FIG. 20 is an explanatory perspective view Of a coupling yoke according to an existing example.
Figure 21:
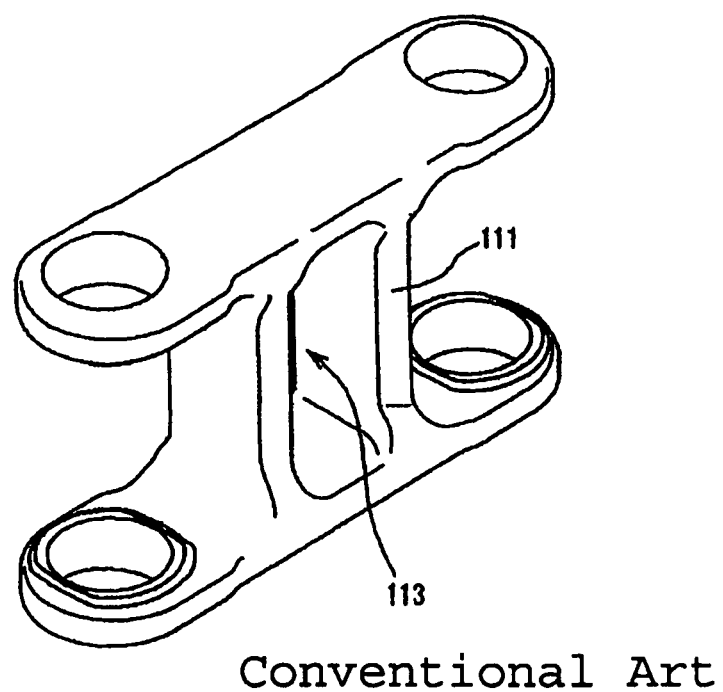
FIG. 21 is an explanatory perspective view of a coupling yoke according to another existing example.

Hereinafter, an embodiment of a coupling yoke according to the invention will be described in detail with reference to the accompanying drawings. FIG. 1 is an explanatory perspective view of a double cardan joint 1 that uses a coupling yoke 2 according to one embodiment of the invention. FIG. 2 is an explanatory perspective view of the coupling yoke 2 shown in FIG. 1. FIG. 3 is a front view of the coupling yoke 2 shown in FIG. 2. FIG. 4 is an explanatory front view of the coupling yoke 2 shown in FIG. 2. FIG. 5 is a plan view of the coupling yoke 2. FIG. 6 is an explanatory plan view of the coupling yoke 2. FIG. 7 is a right side view of the coupling yoke 2. FIG. 8 is an explanatory right side view of the coupling yoke 2. In addition, FIG. 9 is a sectional view taken along the line A-A in FIG. 4; and FIG. 10 is a sectional view taken along the line B-B in FIG. 6. Note that, in FIG. 1, FIG. 2, FIG. 4, FIG. 6 and FIG. 8, FIG. 11, FIG. 13, FIG. 15 and FIG. 17 (appear later) and FIG. 20 and FIG. 21 described above as the existing examples, for the sake of easily understanding the shape of the coupling yoke, auxiliary lines are drawn at curved surface portions.

The double cardan joint 1 is to bendably couple a drive-side yoke (not shown) to a driven-side yoke (not shown) via the coupling yoke 2, a drive-side spider 3 and a driven-side spider 4.

As shown in FIG. 2 to FIG. 6, the coupling yoke 2 includes a center base portion 11 and pairs of flange portions 12 and 13 that are respectively provided at both axial ends (both left and right ends in FIG. 4) of the base portion 11.

The drive-side flange portions 12 each have a bearing hole 14 for allowing a shaft portion 3a, which is one of two perpendicular shaft portions of the drive-side spider 3, to be rotatably installed, and protrude from one axial end of the base portion 11 in the axial direction so as to face each other. The shaft portion 3a is installed in the bearing holes 14 via cylindrical bearings 16. Drive-side yoke installing members 6 for installing the drive-side yoke are rotatably installed on the other shaft portion 3b of the drive-side spider 3 via cylindrical bearings 7.

Similarly, driven-side flange portions 13 also each have a bearing hole 15 for allowing a shaft portion 4a, which is one of two perpendicular shaft portions of the driven-side spider 4, to be rotatably installed, and protrude from another axial end of the base portion 11 in the axial direction so as to face each other. The shaft portion 4a is installed in the bearing holes 15 via cylindrical bearings 17. Driven-side yoke installing members 8 for installing the driven-side yoke are rotatably installed on the other shaft portion 4b of the driven-side spider 4 via cylindrical bearings 9.

As shown in FIG. 4, the base portion 11 has a substantially rectangular shape when viewed from the front side (front side when viewed in the direction along the axis of the other shaft portion 3b or 4b of each spider 3 or 4), and is formed of a thick wall portion 18 that has an X shape when viewed in the direction along the axis of the other shaft portion 3b or 4b of each spider 3 or 4 and trimmed portions 19 between adjacent thick portions 18a of the X-shaped thick wall portion 18. The thick wall portion 18 couples the bearing holes 14 and 15 of the diagonally arranged flange portions 12 and 13.

The thick wall portion 18 in the present embodiment has an X shape as a whole, and is, more specifically, formed of a center rectangular portion 18b and the four thick portions 18a that respectively extend from the four corners of the rectangular portion 18b to the proximal portions of the flange portions 12 and 13. Then, portions between the adjacent thick portions 18a are formed as the trimmed portions 19.

The trimmed portions 19a located between the adjacent flange portions 12 and 13 along the axial direction of the base portion 11 among the four trimmed portions 19 are formed as substantially flat thin wall portions that are trimmed in the direction along the axis of the other, shaft portion 3b or 4b of each spider 3 or 4. On the other hand, the remaining two trimmed portions 19b have a shape such that the wall is steeply trimmed from the center rectangular portion 18b toward the outer side in the axial direction and the thickness finally becomes zero.

The thickness (size in the vertical direction of the sheet in FIG. 4) of the thick wall portion 18 and the width W of each thick portion 18a may be appropriately selected on the basis of the design torque that acts on the coupling yoke 2, the distance in the axial direction between both spiders 3 and 4, and the like.

As in the case of the present embodiment, the base portion 11 is formed of the X-shaped thick wall portion 18 and the trimmed portions 19, so it is possible to ensure the stiffness of the coupling yoke 2. That is, a load applied to the coupling yoke 2 that transmits rotational force acts from the bearing holes 14 and 15 that support the shaft portions of the spiders 3 and 4 on the coupling yoke 2, and more specifically, acts substantially along the lines that connect the bearing holes 14 and 15 of the diagonally arranged flange portions 12 and 13 with respect to the bearing holes 14 and 15 of the four flange portions 12 and 13 of the coupling yoke 2. Against the load that acts in an X shape in this way, the X-shaped thick wall portion 18 is provided along the direction in which the load acts to thereby make it possible to enhance load bearing ability against the load. In other words; it is possible to ensure torsional stiffness.

On the other hand, other portions on which a load does not act so much are trimmed to thereby make it possible to reduce the weight of the coupling yoke 2. In addition, in the present embodiment, the trimmed portions 19a located between the adjacent flange portions 12 and 13 along the axial direction of the base portion 11 are formed as substantially flat thin wall portions that are trimmed in the direction along the axis of the other shaft portion 3b or 4b of each spider 3 or 4, so the flat thin wall portions are fixed by a jig to thereby make it possible to easily form the bearing holes 14 and 15 of the flange portions 12 and 13.

Figure 11:
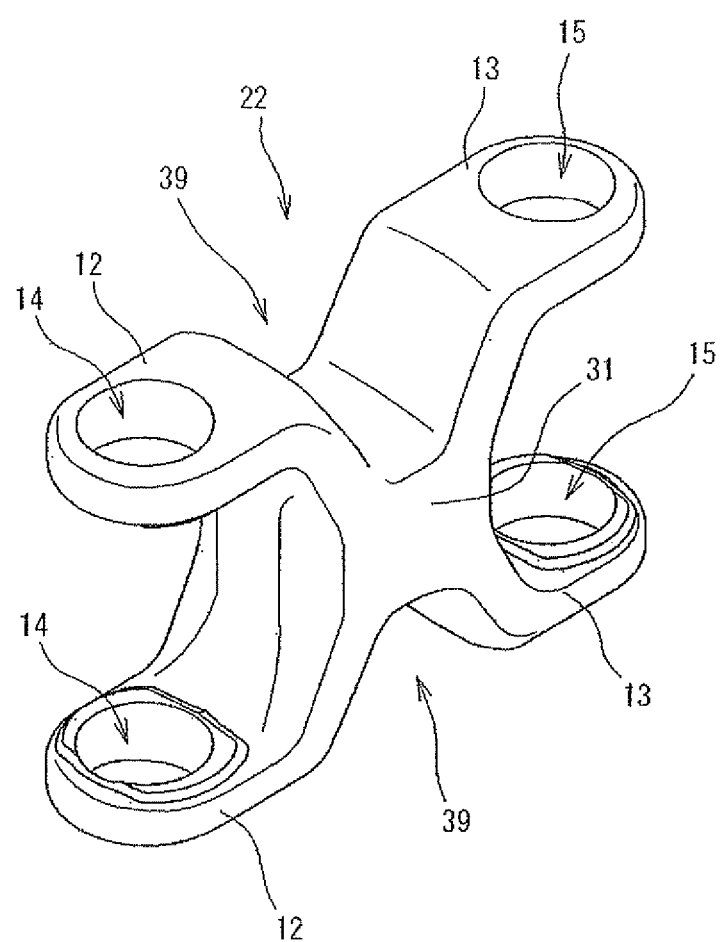
FIG. 11 is an explanatory perspective view of a coupling yoke according to another embodiment of the invention.
Figure 12:
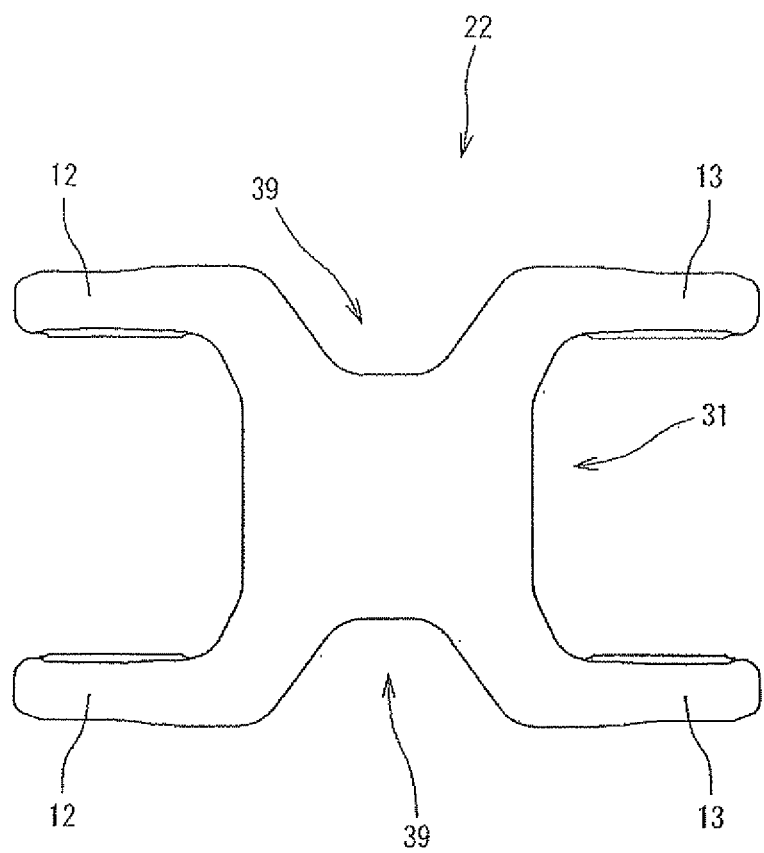
FIG. 12 is a front view of the coupling yoke shown in FIG. 11.
Figure 13:
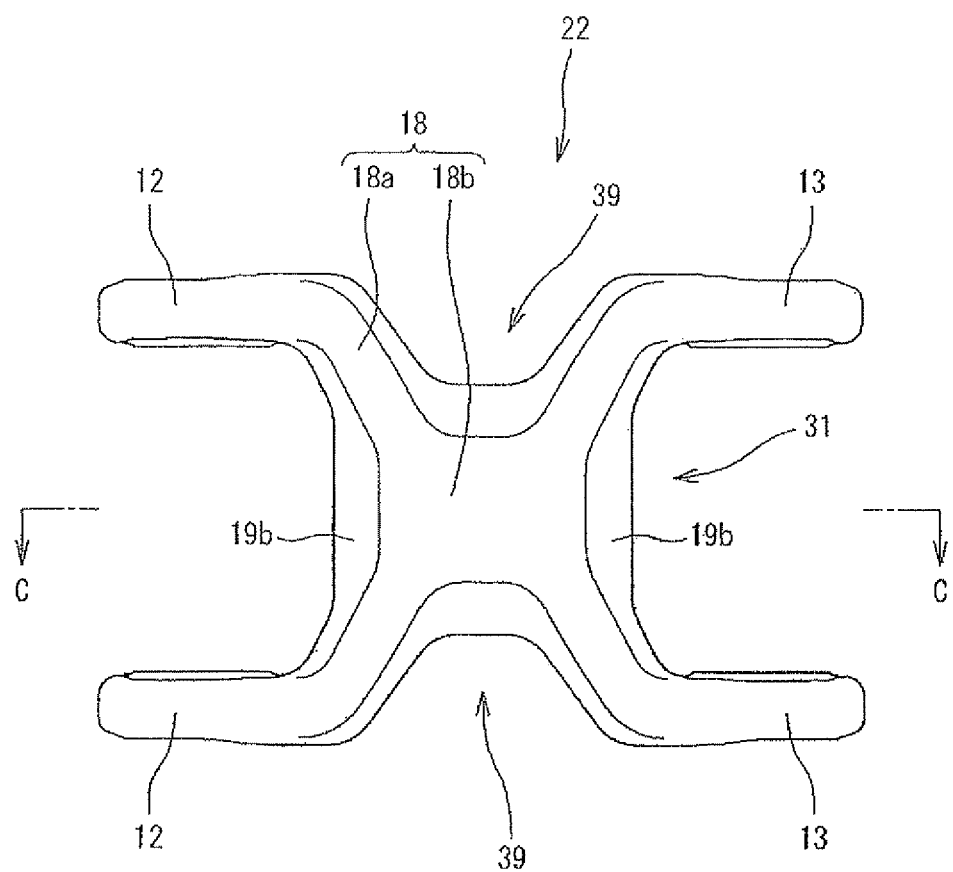
FIG. 13 is an explanatory front view of the coupling yoke shown in FIG. 11.
Figure 14:
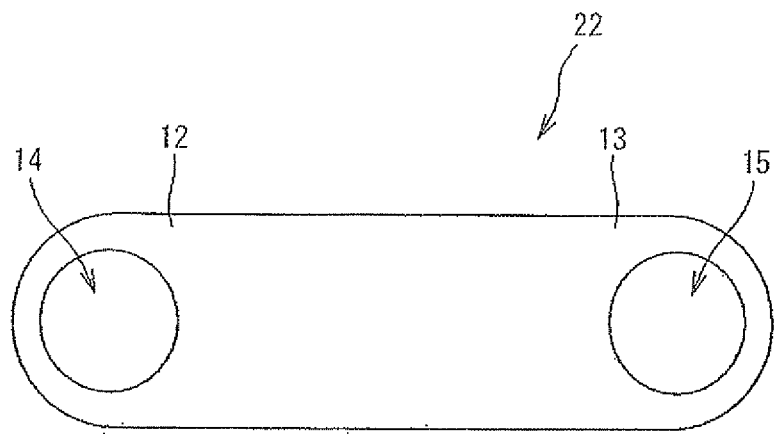
FIG. 14 is a plan view of the coupling yoke shown in FIG. 11.
Figure 15:
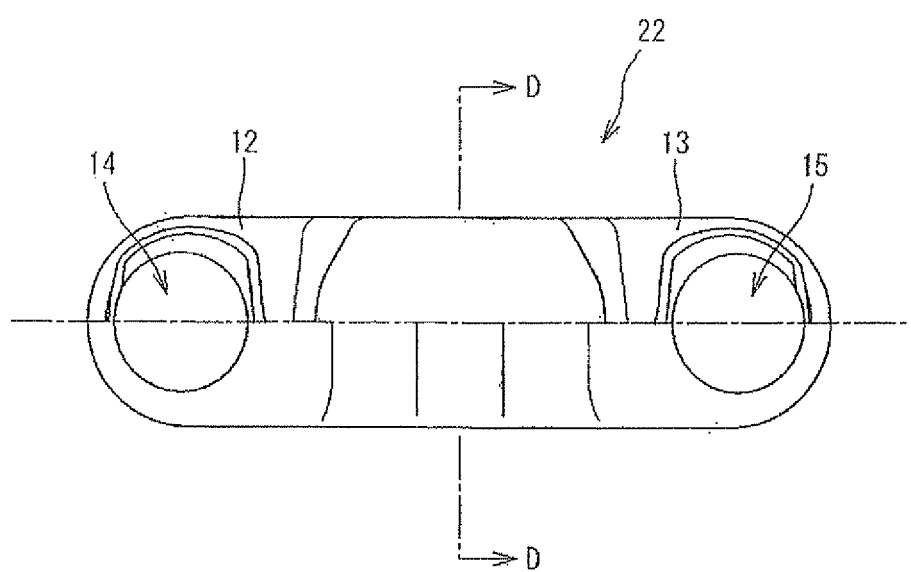
FIG. 15 is an explanatory plan view of the coupling yoke shown in FIG. 11.
Figure 16:
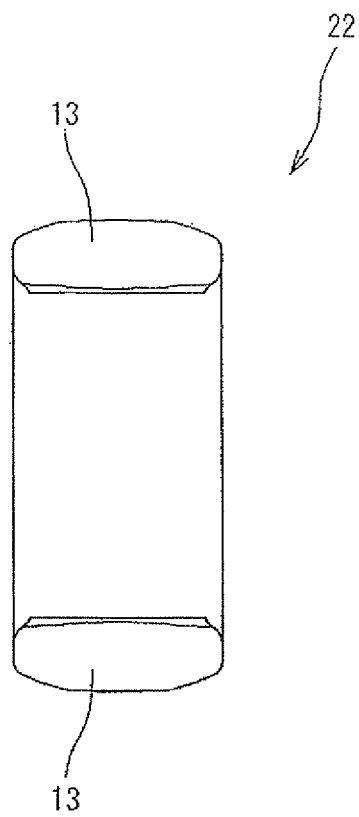
FIG. 16 is a right side view of the coupling yoke shown in FIG. 11.
Figure 17:
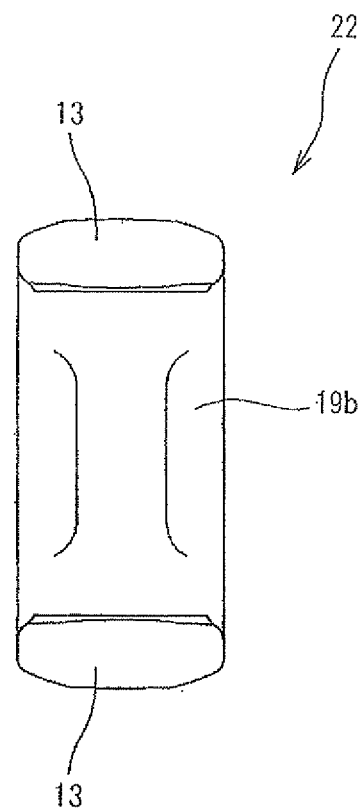
FIG. 17 is an explanatory right side view of the coupling yoke shown in FIG. 11.
Figure 18:
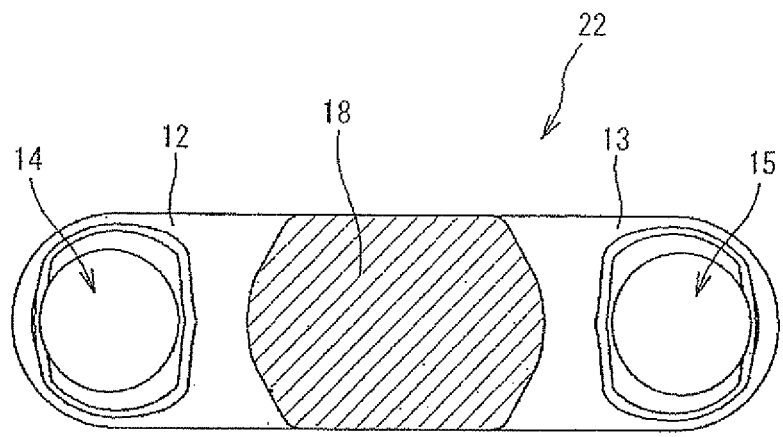
FIG. 18 is a sectional view taken along the line C-C in FIG. 13.
Figure 19:
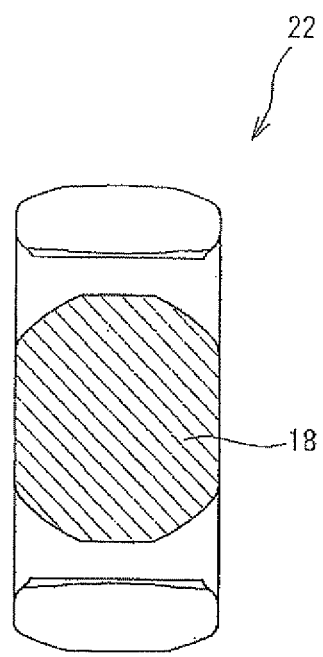
FIG. 19 is a sectional view taken along the line D-D in FIG. 15.

FIG. 11 is an explanatory perspective view of a coupling yoke 22 according to another embodiment of the invention. FIG. 12 is a front view of the coupling yoke 22 shown in FIG. 11. FIG. 13 is an explanatory front view of the coupling yoke 22. FIG. 14 is a plan view of the coupling yoke 22. FIG. 15 is an explanatory plan view of the coupling yoke 22. FIG. 16 is a right side view of the coupling yoke 22. FIG. 17 is an explanatory right side view of the coupling yoke 22. In addition, FIG. 18 is a sectional view taken along the line C-C in FIG. 13, and FIG. 19 is a sectional view taken along the line D-D in FIG. 15.

The coupling yoke 22 differs from the coupling yoke 2 shown in FIG. 2 to FIG. 10 in that trimmed portions 39 located between adjacent flange portions 12 and 13 along the axial direction of the base portion 31 are substantially wholly trimmed. Thus, like reference signs are assigned to common elements or components, and the description thereof is omitted.

In the embodiment shown in FIG. 11 to FIG. 19, the trimmed portions 39 located between the adjacent flange portions 12 and 13 along the axial direction of the base portion 31 are substantially wholly trimmed, so it is possible to further reduce the weight of the coupling yoke 22 while ensuring necessary torsional stiffness.

As described above, a coupling yoke according to an embodiment of the invention is a coupling yoke for a double cardan joint, which includes: a pair of mutually facing flange portions each of which has a bearing hole for allowing one of two perpendicular shaft portions of each spider to be rotatably installed and that protrude from each of both axial ends of a base portion in an axial direction, wherein the base portion is formed of a thick wall portion that couples the bearing holes of the diagonally arranged flange portions and that has an X shape when viewed in a direction along an axis of the other one of the shaft portions of each spider and trimmed portions between adjacent thick portions of the X-shaped thick wall portion.

In the coupling yoke according to the embodiment of the invention, the base portion is formed of the thick wall portion'that has an X shape when viewed in the direction along the axis of the other one of the shaft portions of each spider and the trimmed portions between the adjacent thick portions of the X-shaped thick wall portion, and the thick wall portion couples the bearing holes of the diagonally arranged flange portions.

A load applied to the coupling yoke acts from the bearing holes that support the shaft portions of the spiders on the coupling yoke, and acts substantially along lines that connect the bearing holes of the diagonally arranged flange portions with respect to the bearing holes of the four flange portions of the coupling yoke. This may be confirmed by finite element method (FEM), which is one of numerical analysis methods.

That is, a load applied to the coupling yoke acts in an X shape, so the thick wall portion is provided along the direction in which the load acts to thereby make it possible to ensure the torsional stiffness of the coupling yoke and, in addition, the other portions are trimmed to thereby make it possible to reduce the weight of the coupling yoke. Note that, in the specification, the "axial direction" is a direction along the rotation axis of the coupling yoke that transmits rotational force.

The trimmed portions desirably include a substantially flat thin wall portion that is trimmed in the direction along the axis of the other one of the shaft portions of each spider. In this case, the flat thin wall portion is fixed by a jig to thereby make it possible to easily form the bearing holes of the flange portions.

Among the trimmed portions, the trimmed portions located between the adjacent flange portions along the axial direction of the base portion may be substantially wholly trimmed. In this case, it is possible to further reduce the weight while ensuring necessary torsional stiffness. With the coupling yoke for a double cardari joint according to the embodiment of the invention, it is possible to achieve effective weight reduction while ensuring necessary torsional stiffness.

DESCRIPTION OF REFERENCE NUMERALS 1 double cardan joint
2 coupling yoke
3 drive-side spider
4 driven-side spider
6 drive-side yoke installing member
7 bearing
8 driven-side yoke installing member
9 bearing
11 base portion
12 flange portion (drive side)
13 flange portion (driven side)
14 bearing hole (drive side)
15 bearing hole (driven side)
16 bearing (drive side)
17 bearing (driven side)
18 thick wall portion
18a thick portion
19 trimmed portion
22 coupling yoke
31 base portion
39 trimmed portion

The invention claimed is:

1. A coupling yoke for a double cardan joint, the coupling yoke comprising:
   a base portion oriented in a plane and having first and second axial ends; and
   two pairs of mutually facing flange portions extending from the base portion in an axial direction of the base portion to define the first and second axial ends of the base portion, each of the flange portions in each of the two pairs having a bearing hole arranged to rotatably support a first shaft portion of a spider along an axial direction of the first shaft portion,
   the base portion being formed of a thick wall portion and trimmed portions, the thick wall portion coupling the bearing holes of the flange portions and having an X shape when viewed in a direction orthogonal to the plane in which the base portion is oriented, the thick wall portion further having thick portions extending outward from a central portion of the thick wall portion, each of the trimmed portions being disposed between adjacent thick portions, and
   at least one of the trimmed portions including a substantially flat thin wall portion that is recessed relative to the thick portions in the direction orthogonal to the plane in which the base portion is oriented.

2. The coupling yoke for a double cardan joint according to claim 1, wherein
   the trimmed portions each have a first dimension in the direction orthogonal to the plane in which the base portion is oriented, and the thick portions each have a second dimension in the direction orthogonal to the plane, the second dimension being greater than the first dimension.

3. The coupling yoke for a double cardan joint according to claim 1, wherein
   axially innermost points of the trimmed portions are disposed axially inward of axially innermost points of the thick portions with respect to the axial direction of the base portion.

4. The coupling yoke for a double cardan joint according to claim 1, wherein
   each of the trimmed portions includes the thin wall portion.

* * * * *